United States Patent
Tzeng et al.

[11] Patent Number: 6,151,771
[45] Date of Patent: Nov. 28, 2000

[54] RESISTANCE TEMPERATURE DETECTOR (RTD) FORMED WITH A SURFACE-MOUNT-DEVICE (SMD) STRUCTURE

[75] Inventors: Jackel Tzeng, Wuhon; Roger Hsieh, Sikung; Duen-Jen Cheng, Chutung, all of Taiwan

[73] Assignee: Cyntec Company, Hsinchu, Taiwan

[21] Appl. No.: 09/274,736

[22] Filed: Mar. 23, 1999

Related U.S. Application Data

[62] Division of application No. 08/872,564, Jun. 10, 1997.

[51] Int. Cl.$^7$ .................................................. H01C 17/00
[52] U.S. Cl. ........................ 29/610.1; 29/612; 338/195
[58] Field of Search .................................. 29/610.1, 612, 29/619; 338/195

[56] References Cited

U.S. PATENT DOCUMENTS

| | | | |
|---|---|---|---|
| 3,568,125 | 3/1971 | Villemant et al. | 338/22 |
| 4,079,349 | 3/1978 | Dorfeld | 338/9 |
| 4,563,564 | 1/1986 | Ericsen et al. | 219/121 |
| 4,746,896 | 5/1988 | Mcquaid et al. | 338/314 |
| 4,789,888 | 11/1988 | Yoneda et al. | 338/22 R |
| 4,792,781 | 12/1988 | Takahashi et al. | 338/307 |
| 4,906,965 | 3/1990 | Murata et al. | 338/25 |
| 4,924,205 | 5/1990 | Caporali et al. | 338/227 |
| 5,043,694 | 8/1991 | Higashi et al. | 338/195 |
| 5,046,236 | 9/1991 | Wada et al. | 29/610.1 |
| 5,153,869 | 10/1992 | Ferraris et al. | 156/652 |
| 5,699,607 | 12/1997 | McGuire et al. | 29/612 |

FOREIGN PATENT DOCUMENTS

| | | |
|---|---|---|
| 0 443 618 | 8/1991 | European Pat. Off. . |
| 64-73702 | 3/1989 | Japan . |
| 1-91401 | 4/1989 | Japan . |
| 1-289222 | 11/1989 | Japan . |
| 2-264405 | 10/1990 | Japan . |
| 4-180602 | 6/1992 | Japan . |
| 5-21204 | 1/1993 | Japan . |
| 5-21205 | 1/1993 | Japan . |
| 5-166604 | 7/1993 | Japan . |
| 5-205913 | 8/1993 | Japan . |
| 5-283207 | 10/1993 | Japan . |
| 6-96914 | 4/1994 | Japan . |

*Primary Examiner*—Carl J. Arbes
*Attorney, Agent, or Firm*—Bo-In Lin

[57] ABSTRACT

The present invention discloses a method for manufacturing a surface mount resistance-temperature-detector (RTD) on a substrate. The manufacture method includes the steps of (a) depositing a resistive thin film on a top surface of the substrate having a substantially linear temperature resistance coefficient (TCR) over a predetermined temperature range for temperature measurement; (b) patterning the resistive film into a plurality of resistive strips and a plurality of top terminals near two opposite edges on the top surface of the substrate with each resistive strip connected between two top terminals; (c) forming a bottom electrode on a bottom surface of the substrate underneath each of the top terminals; (d) depositing two edge conductive plates on edge surfaces of the substrate for connecting one of the top terminals to a bottom terminal thereunder; and (e) forming two surface mount solder electrodes with a conductive layer overlying the top terminal, the edge conductive plate and the bottom terminal provided for performing a surface-mount soldering operation thereon.

10 Claims, 5 Drawing Sheets

RESISTANCE TEMPERATURE DETECTOR (RTD) FORMED WITH A SURFACE-MOUNT-DEVICE (SMD) STRUCTURE

This application is a Divisional application and claims an earlier filing date of a pending patent application Ser. No. 08/872,564, filed on Jun. 10, 1997, by the same inventors of this application.

BACKGROUND OF THE INVENTION

1. Field of the Invention

This invention relates generally to the structure and processes for manufacturing a resistance temperature device (RTD). More particularly, this invention relates to an improved structure and manufacture process to provide a highly stable, reliable and low cost resistance temperature detector (RTD) by forming the resistance temperature detector with a surface mounted device (SMD) structure whereby a miniaturized RTD devices can be produced by mass production processes and the RTDs can be conveniently implemented in a wide variety of modern electronic applications.

2. Description of the Prior Art

Even though the temperature measurement conducted by employing a resistance temperature detector (RTD) is well known in the art, however, broad applications of the resistance temperature detector (RTD) are still limited by several technical difficulties. Specifically, the high precision low cost surface mount device (SMD) type packaging RTD is difficult to manufacture due to the incompatibility of the manufacturing processes and materials between which are commonly employed for RTD device and the SMD packaging technology. Additionally, connections to the input and output terminals of a RTD with conventional structure formed with the thin film resistors disposed on a flat substrate is also very inconvenient due to the requirements to form thin connection leads. A difficult task of managing many thin lead connections in very small space is commonly encountered. Labor intensive and time consuming lead welding or bonding processes are required to complete the task of lead connection. As more electronic devices are being miniaturized, the configuration of a conventional RTD often limits its usefulness due the difficulties in forming such small connections in very limited available spaces.

Conventional resistance temperature detectors (RTDs) are most commonly manufactured by either (a) forming wire coils around insulating material such as aluminum oxide or (b) applying a thin film process to form a layer of resistive RTD film on a substrate such as the aluminum oxide or silicon oxide substrate and then pattern the resistive film to the RTD. In the second method, in order to increase the adhesion of the RTD resistive film such as platinum film to the substrate, and to assure layer compatibility between the substrate and the RTD film, an intermediate layer, composed of a material such as inconel alloy or nickel to function as an interface between the substrate and the RTD film is often formed. After the RTD film is formed, the entire device supported on the substrate is annealed at an elevated temperature before the RTD resistor is patterned and trimmed to obtain the designed resistance value. A dicing process is then carried out to divide the RTDs formed on the substrate into chips. These chips are further processed by parallel gap welding, and high temperature passivation layer formation. Each chip is then packaged as a RTD device. The processes of welding and packaging involve procedures which are time consuming and cannot be conveniently automated. Due to these limitations, the production costs of RTD devices are high. Additionally, in order to apply these RTD devices to temperature measurement, the RTD often has to be welded on for connection to terminals to supply a RTD voltage. The costs and complexity of applying the RTDs are further adversely affected by these connection welding requirements. For these reasons, the RTDs are typically employment only for industrial applications or high temperature measurements. Due to its high production costs, the RTDs are seldom employed in measurement of temperature of lower ranges. Moreover, the RTDs are not suitable for applications where limited space are available due to the requirements of welding onto the power supply terminals by the use of electrical wires for providing power source to the thin film resistors for measuring the temperature.

Many prior art discloses various types of RTDs wherein these RTDs are basically provided with a similar structure which requires lead connectors and welding of these lead connectors to other existing circuits for providing voltage source to the RTDs. One example of this is a platinum resistance thermometer. Jinda et al. disclose in U.S. Pat. No. 4,805,296 entitled "Method of Manufacturing Platinum Resistance Thermometer" (issued on Feb. 21, 1989) a method of manufacturing a resistance thermometer by preparing a support substrate and forming a platinum film serving as a temperature measuring element. The platinum is formed by a sputtering process on the substrate with an aluminum oxide film serving as a stabilizing layer to improve the stability and reproducibility of the sensor characteristics, namely the platinum layer. FIGS. 1A and 1B are respectively a cross sectional view and a perspective view of this RTD device where lead wires 5 are employed for connection to a voltage source.

Toenshoff discloses in U.S. Pat. No. 4,146,957, entitled "Thick Film Resistance Thermometer" (issued on Aug. 3, 1970), a folded, highly pure platinum, thick film path on a ceramic cylinder substrate for providing a high temperature coefficient of resistance thermometer. A rotary thick film printing technique is used to form the platinum resistor path on the ceramic cylinder. As shown in FIG. 2, again, lead wires 14 are employed for external connections. For modern electronic applications, the task of welding these wire leads to the circuits usually disposed on a printed circuit boards is labor intensive and time consuming. In addition, for electronic device where miniaturization is a primary consideration, the use of RTD with wire lead connection can be very inconvenient due to the need of welding the leads to circuits with very limited working space and typically provided points of connection of very small dimensions.

Therefore, a need still exists in the art of design and structure of linear thermometers and the manufacture processes and package of RTDs to provide an improved structural configuration and manufacture method for packaging of the linear thermometers which is simpler in structure, easier for streamlining and automating the manufacture processes while providing better interface connection features such that the liner thermometers such as RTDs can be manufactured at lower costs and be conveniently implemented in broad variety of temperature measurement applications.

SUMMARY OF THE PRESENT INVENTION

It is therefore an object of the present invention to provide a new structural configuration and manufacture method for packaging the RTD devices which would enable those of ordinary skill in the art to overcome the aforementioned difficulties and limitations encountered in the prior art.

Specifically, it is an object of the present invention to provide a new structural configuration and manufacture method for packaging the linear RTD device by applying a surface mount technology (SMT) to provide a device structure which can be conveniently streamlined and automated to greatly reduce the manufacture cost of the RTDs.

Another object of the present invention is to provide a new structural configuration and manufacture method for packaging the linear RTD device by applying a surface mount technology (SMT) to provide a device structure which can be conveniently mounted on to existing circuits typically on a printed circuit board (PCB) for modern electronic applications such the linear RTD can be more broadly applied.

Another object of the present invention is to provide a structural configuration and manufacture method for packaging the linear RTD device by applying a surface mount technology (SMT) to provide a device structure which can be conveniently mounted on to existing circuits and good reliable contacts can be maintained without requiring a welding or wire bonding operations.

Briefly, in a preferred embodiment, the present invention discloses a surface-mount resistance-temperature-detector (RTD) supported on a substrate. The surface-mount RTD includes a resistive strip disposed on a top surface of the substrate having a substantially linear temperature resistance coefficient (TCR) over a predetermined temperature range for measurement. The surface-mount RTD further includes two top terminals disposed on two opposite end on the top surface of the substrate wherein each of the top terminal connected to one end of the resistive strip. The surface-mount RTD further includes two bottom terminals disposed on a bottom surface of the substrate wherein each of the bottom terminals is disposed below one of the top terminals. The surface-mount RTD further includes two edge conductive plates each disposed on an edge surface of the substrate connected to one of the top terminals to a corresponding bottom terminal below. The surface-mount RTD further includes two surface mount solder electrodes wherein each solder electrode constituting a conductive layer overlying the top terminal, the edge conductive plate and the bottom terminal provided for performing a surface-mount soldering operation thereon. In a preferred embodiment, the surface-mount RTD further includes a passivation protective layer covering and protecting the resistive strip. In a preferred embodiment, the surface-mount RTD further includes two terminal-solder buffer pastes each disposed on top of the top surface terminal under the surface-mount solder electrode for buffering the top terminal and the solder electrode. In a preferred embodiment, the resistive strip is a platinum resistive strip having a temperature coefficient of resistance (TCR) ranging from 3000 to 3900 ppm/° C.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
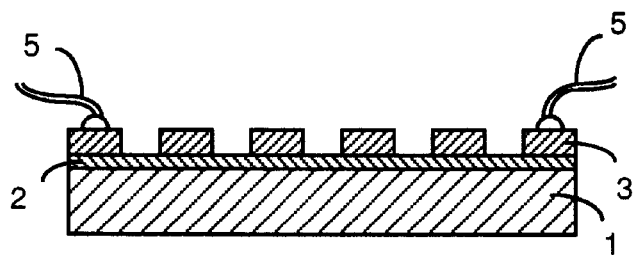
FIGS. 1A and 1B are respectively a cross sectional view and a perspective view of a prior art thin film RTD device provided with lead wires for external connection.
Figure 1B:
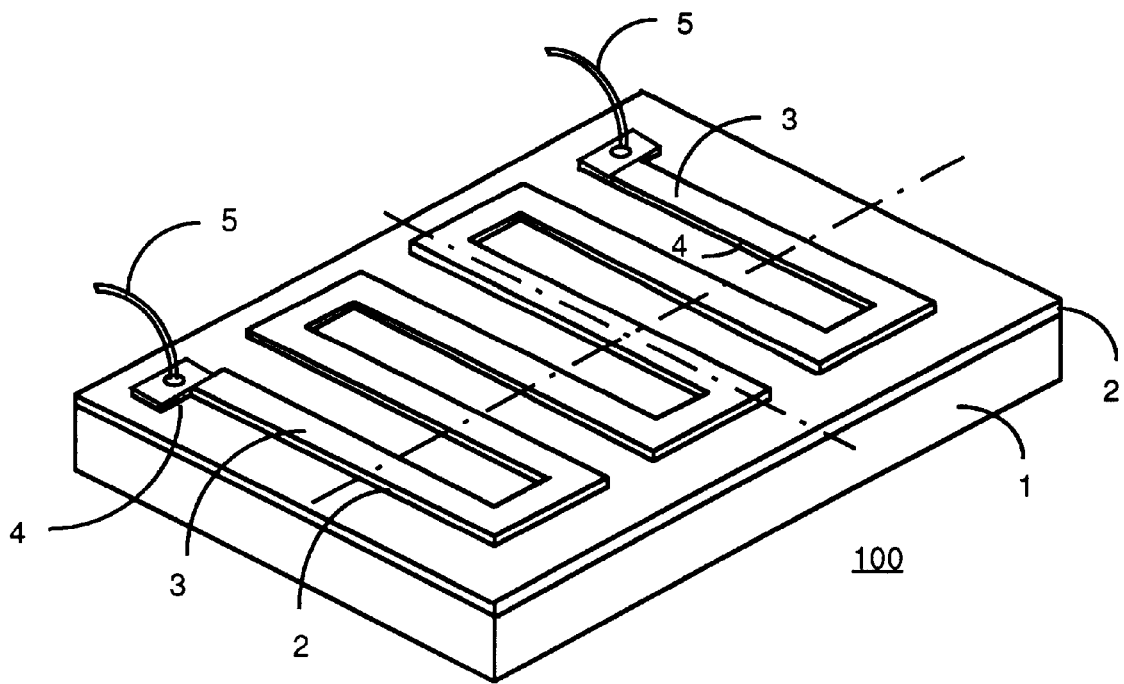
Figure 2:
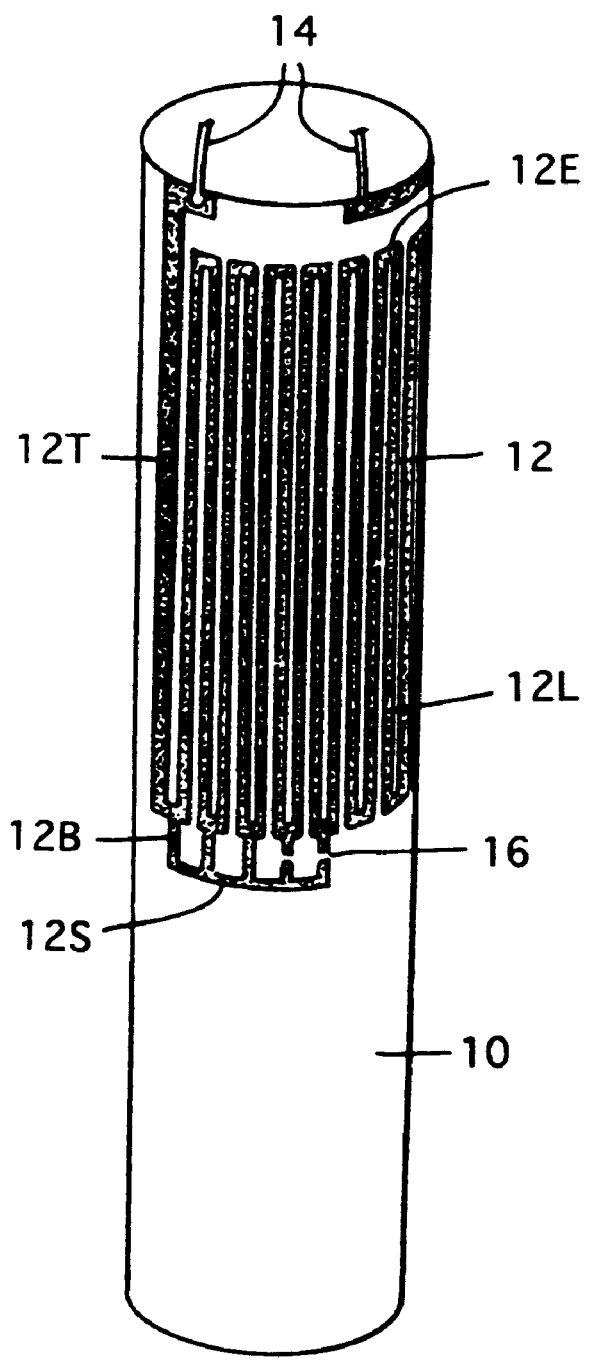
FIG. 2 is another partial perspective view showing the structure of a different RTD thermometer formed on a ceramic cylinder employed in a device of another prior art patent.
Figure 3A:
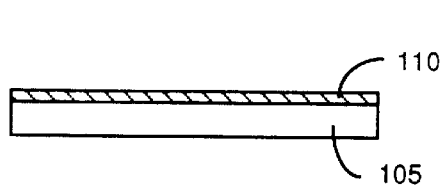
FIGS. 3A to 3P are a series of cross sectional views and perspective views to show the manufacture process for making a RTD by using the surface mount technology (SMT) according to the present invention.
Figure 3B:
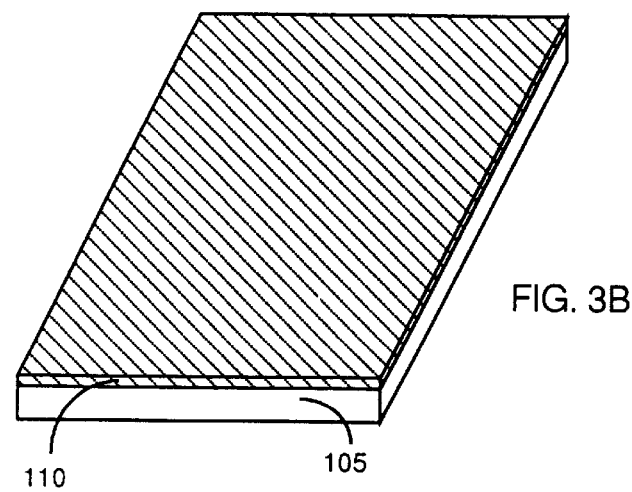
Figure 3C:
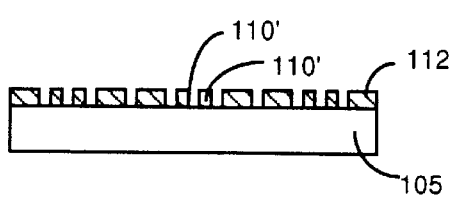
Figure 3D:
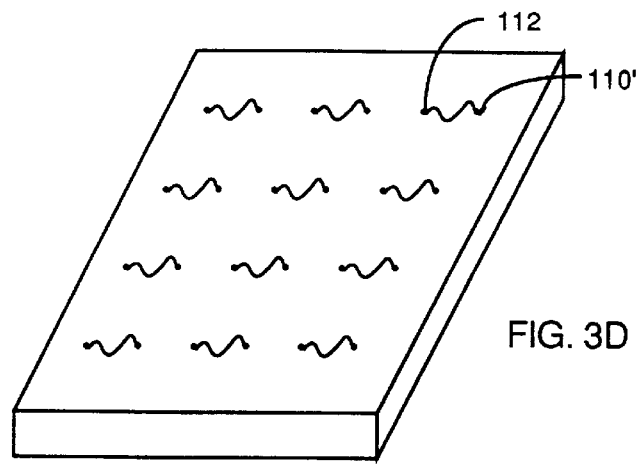
Figure 3E:
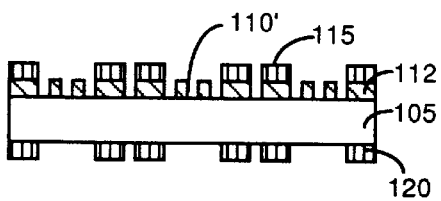
Figure 3F:
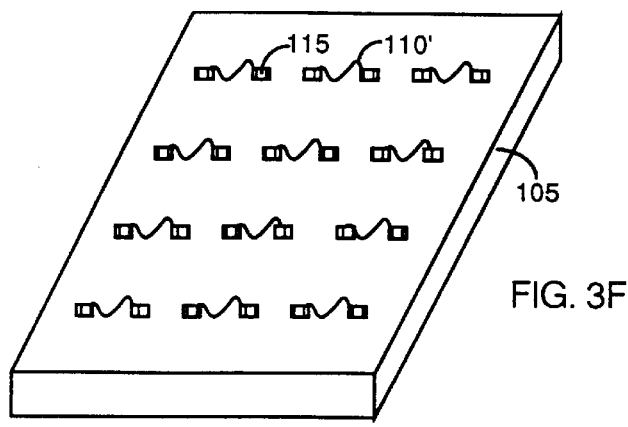
Figure 3G:
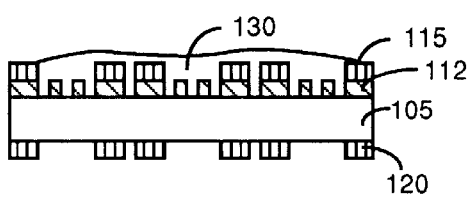
Figure 3H:
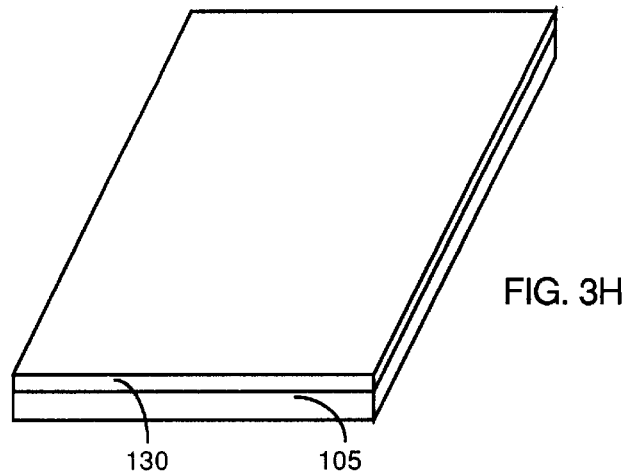
Figure 3I:
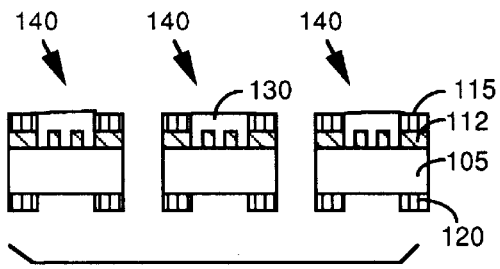
Figure 3J:
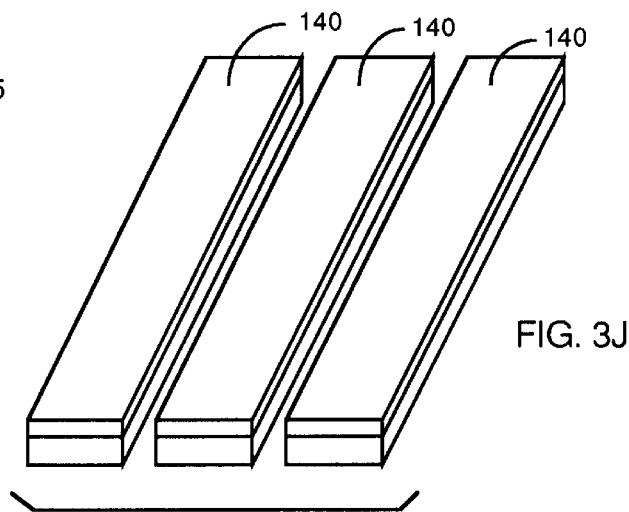
Figure 3K:
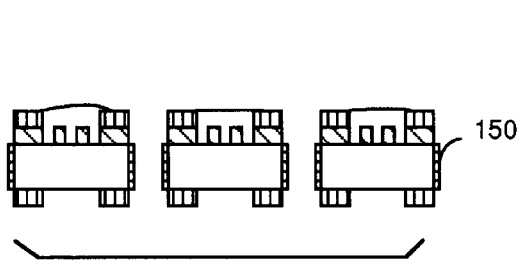
Figure 3L:
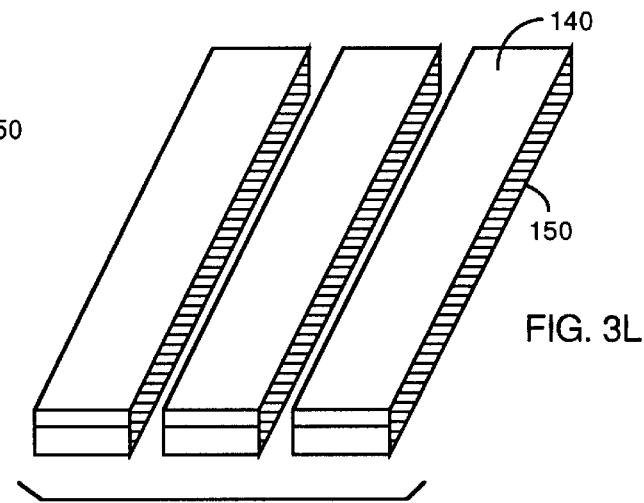
Figure 3M:
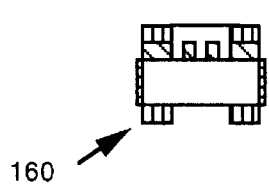
Figure 3N:
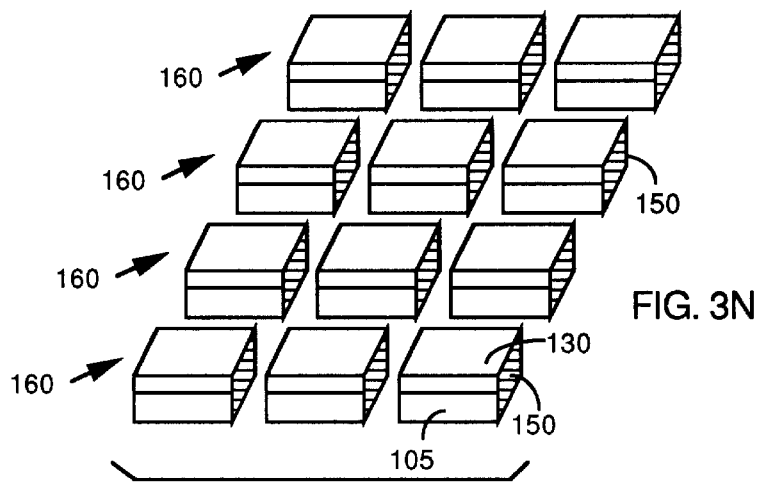
Figure 3O:
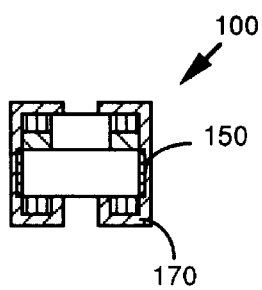
Figure 3P:
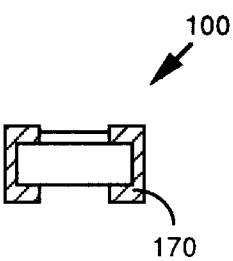

Please refer to FIGS. 3A to 3P, which include a series of cross sectional views and correspondent perspective views for describing the processing steps of fabricating the surface-mounted type linear resistance thermometer 100 of this invention. In FIGS. 3A and 3B, a substrate 105 is prepared and cleaned with a regular cleaning process. The substrate 105 may preferably be an aluminum oxide (Al2O3) sheet or a glass substrate. Then a resistance temperature detecting (RTD) film 110, such as platinum film, of about one micrometer (1 $\mu$m) is deposited by applying a sputtering deposition process with a power of 300 W for a sputtering time about two hours at a pressure of 5×10-3 Torr. The RTD film is preferably formed with linear temperature coefficient of resistance (TCR) at a temperature range which is to be measured by the linear thermometer 100. Referring to FIGS. 3C and 3D, the RTD film is then patterned by etching or laser trimming processes, to define resistor strips 110' and corresponding terminals 112 on both ends of the resistor strips on the top surface of the substrate 105 for conducting electric current via these RTD resistor 110'. An anneal process at a temperature around 1000° C. for about two hours is then carried out on the patterned resistor strips 110' and the terminals 112 disposed on the substrate 105. Referring to FIGS. 3E and 3F, an electrode printing process is then carried out to print a gold paste 115 as top electrode and a Pd/Ag paste as the bottom electrode 120. The top and bottom electrodes have a layer thickness of approximately five to twenty micrometers. The multiple layer structure developed on the substrate 105 is then processed with a heat treatment at a temperature of approximately 850° C. for sintering the electrodes. The top and bottom electrodes can be made with various types of conductive thin films formed by sputtering process or other thin film deposition methods with a film thickness ranging from submicrons to twenty microns depending on the requirements of specific applications.

A laser trimming is then performed on the RTD resistors 110' to further adjust the resistance of the resistor strips 110'. Referring to FIGS. 3G and 3H, a protective layer 130 is then printed over the entire top surface followed by a heat treatment at 600° C. to stabilize the protective layer 130. A marking process is performed to define the boundary lines for dividing the RTDs into individual chips suitable for subsequent packaging processes for making surface mount type of chips. Based on the boundary lines defined by the marking process, a scribing process is conducted to cut a scribing lines along the marked boundary lines.

Referring to FIGS. 3I and 3J, a stick break process is first performed to separate the structure including a plurality of RTDs supported on the substrate into a plurality of sticks 140. In FIGS. 3K and 3L, an edge sputtering is performed to deposit a thin film of NiCr layer 150 having a thickness of about 300 to 1000 Angstroms on the edges of the sticks 140. The edge layer 150 serves to electrically connect the top electrode 115 to the bottom electrode 120. In FIGS. 3M and 3N, the sticks 140 are then broken into RTD chips 160. In FIGS. 3O and 3P, an electrode plating is then performed to form an electrode layer 170 which includes a nickel layer of about three to seven micrometers and a SnPb layer of about three to eight micrometers. Alternately, a Pb—Ag solder layer can be applied to form this solder layer 170. The electrode layer 170 serves as a solder layer wrapping the edge surfaces a portion of the top and the bottom surface such that this RTD chip is ready to be implemented by a surface mount soldering process onto printed circuit boards or circuits arranged in other types of configurations for temperature measurements. The gold paste 115 formed on top of the terminals 112 on the top surface functions as a buffer interface between the terminal 112 composed of platinum and the solder layer 170. The potential problems of poor attachment between the platinum terminals 112 and the solder layer 170 which is partially caused by differences in thermal expansion is resolved by applying the gold paste 115 as a buffer interface.

According to FIGS. 3A to 3P and the above description, this invention discloses a method for manufacturing a surface mount resistance-temperature-detector (RTD) on a substrate. The manufacture method includes the steps of (a) depositing a resistive thin film 110 on a top surface of the substrate 105 having a substantially linear temperature resistance coefficient (TCR) over a predetermined temperature range for temperature measurement; (b) patterning the resistive film into a plurality of resistive strips 110' and a plurality of top terminals 112 near two opposite edges on the top surface of the substrate with each resistive strip 110' connected between two top terminals 112; (c) forming a bottom electrode 120 on a bottom surface of the substrate underneath each of the top terminals 112; (d) depositing two edge conductive plates 150 on edge surfaces of the substrate for connecting one of the top terminals 112 to a bottom terminal 120 thereunder; and (e) forming two surface mount solder electrodes 170 with a conductive layer overlying the top terminal 112, the edge conductive plate 150 and the bottom terminal 120 provided for performing a surface-mount soldering operation thereon. In a preferred embodiment, the method of manufacturing the surface mount RTD further includes a step of forming a passivation protective layer 130 covering and protecting the resistive strip 110'. In yet another preferred embodiment, the method of manufacturing the surface-mount RTD of further includes a step of forming two terminal-solder buffer pastes 115 each on top of the top surface terminal 112 under the surface-mount solder electrode 170 for buffering the top terminal 112 and the solder electrode 170. In yet another preferred embodiment, the method of manufacturing the surface-mount RTD of further includes a step of forming two thin film terminal-solder buffer layers 115 each composed of a NiCr layer thickness of about three-hundred (300) to one thousand (1000) Angstroms on top of the top surface terminal 112 under the surface-mount solder electrode 170 for buffering the top terminal 112 and the solder electrode 170.

Figure 4:
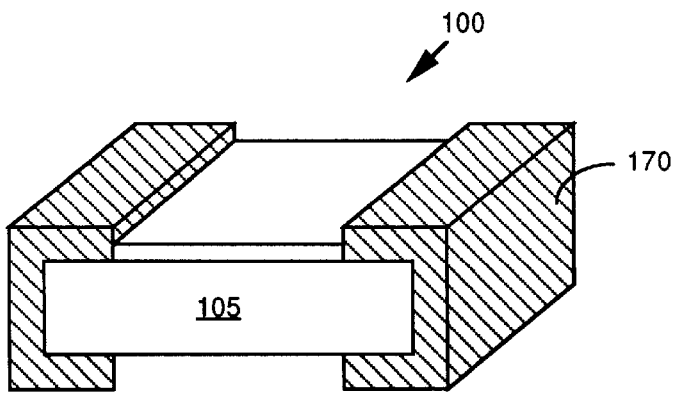
FIG. 4 is a perspective view of a linear resistive temperature detector (RTD) manufactured with a SMT configuration according to FIGS. 3A to 3E of the present invention.

A perspective view of a linear resistance temperature detector (RTD) preferably fabricated with platinum resistive strips is shown in FIG. 4. The RTD 100 is supported on a substrate 105 composed of silicon dioxide, i.e., $SiO_2$ or $Al_2O_3$. A surface mount solder layer 170 is formed on two side edges of the RTD device 100. The RTD is ready for mounted on and connected to existing circuits by a soldering process. The top surface of the RTD device 100 is protected by a passivation protective layer 130. The solder layer 170 is in electrical connection with a terminal 112 via an interface buffer gold paste layer 115. The terminals 112 are connected to platinum resistive strips 110' covered under the passivation protective layer 130. The platinum resistive strips are laser patterned and trimmed to have a certain resistance which is varied according to a linear temperature coefficient of resistance (TCR) in certain temperature range. The solder-electrode structure as that shown in FIG. 4 provides the advantages that the RTD device can be easily mounted on miniaturized circuits by the use of surface mounted technology. The gold paste 115 above the terminal 112 further provides good attachment and thermal compatibility as a buffer interface to the solder electrode 170. Stable and reliable resistive temperature detection device is therefore provide by this invention. In addition to the gold paste, a buffer interface can also be made with a NiCr thin film. By employing the manufacture process and the SMT structure of the present invention, a RTD sensor of very compact size, e.g., length and width ranging from half to few millimeters (mm) such as 1.2 mm by 2.0 mm, can be produced. The RTD sensors with compact size can be easily mounted onto circuits disposed on printed circuit board without requiring extra spaces or connection terminals on the circuits for attaching and bonding to the thin connection lead-wires as that required in the prior art devices. The TCR and the resistance for each of these RTD can also be flexibly arranged and adjusted, by using different resistive conductive strips and trimming the strips into various lengths, during the manufacture processes. Examples of such TCR values can be 3700, 3780 and 3850 ppm/° C. and the resistance can be 100, 500, or 1000 ohms.

According to FIGS. 3A to 3P and FIG. 4, the present invention discloses a surface-mount resistance-temperature-detector (RTD) 100 supported on a substrate 105. The surface-mount RTD 100 includes a resistive strip 110' disposed on a top surface of the substrate 105 having a substantially linear temperature resistance coefficient (TCR) over a predetermined temperature range for measurement The surface-mount RTD 100 further includes two top terminals 112 disposed on two opposite end on the top surface of the substrate wherein each of the top terminal 112 connected to one end of the resistive strip 110'. The surface-mount RTD 100 further includes two bottom terminals 120 disposed on a bottom surface of the substrate wherein each of the bottom terminals 120 is disposed below one of the top terminals 112. The surface-mount RTD further includes two edge conductive plates 150 each disposed on an edge surface of the substrate connected to one of the top terminals to a corresponding bottom terminal below. The surface-mount RTD 100 further includes two surface mount solder electrodes 170 wherein each solder electrode constituting a conductive layer 170 overlying the top terminal 112, the edge conductive plate 150 and the bottom terminal 120 provided for performing a surface-mount soldering operation thereon. In a preferred embodiment, the surface-mount RTD 100 further includes a passivation protective layer 130 covering and protecting the resistive strip 110'. In another preferred embodiment, the surface-mount RTD 100 further includes two terminal-solder buffer pastes 115 each disposed on top of the top surface terminal 112 under the surface-mount solder electrode 170 for buffering the top terminal 112 and the solder electrode 170. In a preferred embodiment, the resistive strip 110' is a platinum resistive strip having a temperature coefficient of resistance (TCR) ranging from 3000 to 3900 ppm/° C. In alternate preferred embodiments, the resistive strips 100' can be a nickel, copper, tungsten, or other conductive strips which have ranges of temperatures with linear temperature coefficients of resistance (TCR).

Therefore, the present invention provides a new structural configuration and manufacture method for fabricating the RTD devices which would enable those of ordinary skill in the art to overcome the difficulties and limitations encountered in the prior art. Specifically, a surface mount technology (SMF) is employed to fabricated the RTD to provide a device structure which can be conveniently streamlined and automated to greatly reduce the manufacture cost of the RTDs. By applying a surface mount technology (SMT), a device structure is provided which can be conveniently mounted on to existing circuits typically on a printed circuit board (PCB) for modern electronic applications such that the linear RTD can be more broadly applied. Furthermore, with surface mount configuration, good and reliable contacts can be maintained without requiring a welding or wire bonding operations.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A method for manufacturing a surface mount resistance-temperature-detector (RTD) on a substrate, comprising:

depositing a resistive thin film on a top surface of said substrate having a substantially linear temperature resistance coefficient (TCR) over a predetermined temperature range for temperature measurement;

patterning said resistive film into a plurality of resistive strips and a plurality of top terminals at both ends of said resistive strips on said top surface of said substrate with each resistive strip connected between two top terminals;

forming a plurality of bottom terminals each disposed on a bottom surface of said substrate underneath each of said top terminals followed by scribing along scribing lines substantially perpendicular to said resistive strips and extended between said plurality of top terminals with every two adjacent scribing lines defining two elongated edges of a plurality of elongated substrate sticks and breaking said substrate along said scribing lines into a plurality of said elongated substrate sticks, with each of said top terminals and bottom terminals disposed on said elongated edges of said elongate substrate sticks;

depositing two edge conductive plates on edge surfaces along said elongated edges of said substrate sticks for connecting each of said top terminals to each of a corresponding bottom terminals thereunder followed by scribing and breaking said substrate sticks into a plurality of RTD chips; and forming two surface mount solder electrodes with a conductive layer overlying said top terminal, said edge conductive plate and said bottom terminal provided for performing a surface-mount soldering operation thereon.

2. The method of manufacturing said surface-mount RTD of claim 1 further comprising:

forming a passivation protective layer covering and protecting said resistive strip before said step of scribing and breaking said substrate into said plurality of elongated substrate sticks along said scribing lines substantially perpendicular to said resistive film and extended between said top terminals.

3. The method of manufacturing the surface-mount RTD of claim 1 further comprising:

depositing terminal-solder buffer pastes on top of said top terminals right after patterning the top terminals for buffering said top terminal and said solder electrodes.

4. The method of manufacturing the surface-mount RTD of claim 1 further comprising:

forming a thin film terminal-solder buffer pastes each composed of a NiCr layer having a thickness of about three-hundred (300) to one thousand (1000) Angstroms on top of said top terminals right after patterning the top surface terminals for buffering said top terminals and said solder electrodes.

5. The method of manufacturing the surface-mount RTD of claim 1 wherein:

said step of depositing a resistive thin film on a top surface of said substrate is a step of depositing a platinum thin film having a temperature coefficient of resistance (TCR) ranging from 3000 to 3900 ppm/° C.

6. The method of manufacturing the surface-mount RTD of claim 1 further comprising:

said step of depositing a resistive thin film on a top surface of said substrate is a step of depositing a nickel thin film having a temperature coefficient of resistance (TCR) ranging from 4000 to 6500 ppm/° C.

7. The method of manufacturing the surface-mount RTD of claim 1 wherein:

said step of depositing a resistive thin film on a top surface of said substrate is a step of depositing a copper thin film having a temperature coefficient of resistance (TCR) ranging from 3000 to 4000 ppm/° C.

8. The method of manufacturing the surface-mount RTD of claim 1 wherein:

said step of depositing a resistive thin film on a top surface of said substrate is a step of depositing a tungsten thin film having a temperature coefficient of resistance (TCR) ranging from 3000 to 3800 ppm/° C.

9. A method of manufacturing a surface-mount resistance-temperature-detector (RTD) supported on a substrate, comprising:

depositing a resistive thin film on a top surface of said substrate having a substantially linear temperature resistance coefficient (TCR) over a predetermined temperature range for temperature measurement;

patterning said resistive film into a plurality of resistive strips and a plurality of top terminals at both ends of said resistive strips on said top surface of said substrate with each resistive strip connected between two top terminals followed by depositing terminal-solder buffer pastes on top of said top surface terminals;

forming a passivation protective layer covering and protecting said resistive strip;

forming a plurality of bottom terminals each disposed on a bottom surface of said substrate underneath each of said top terminals followed by scribing along scribing lines substantially perpendicular to said resistive strips and extended between said plurality of top terminals with every two adjacent scribing lines defining two elongated edges of a plurality of elongated substrate sticks and breaking said substrate along said scribing lines into a plurality of said elongated substrate sticks, with each of said top terminals and bottom terminals disposed on said elongated edges of said elongate substrate sticks;

depositing two edge conductive plates on edge surfaces along said elongated edges of said substrate sticks for connecting each of said top terminals to each of a corresponding bottom terminals thereunder followed by scribing and breaking said substrate sticks into a plurality of RTD chips; and forming two surface mount solder electrodes with a conductive layer overlying said terminal solder pastes, said edge conductive plate and said bottom terminal provided for performing a surface-mount soldering operation thereon.

10. The method of manufacturing the surface-mount RTD of claim 9 wherein:

said step of forming said terminal-solder buffer pastes on top of said top terminals is a step of forming two thin film terminal-solder buffer layers each composed of a NiCr layer thickness of about three-hundred (300) to one thousand (1000) Angstroms disposed on top of said top terminals under said surface-mount solder electrodes for buffering said top terminals and said solder electrodes.

* * * * *